US00RE44405E

(19) United States
(12) Reissued Patent
Kobayashi et al.

(10) Patent Number: US RE44,405 E
(45) Date of Reissued Patent: Aug. 6, 2013

(54) SWITCH INTEGRATED CASING AND ELECTRONIC EQUIPMENT HAVING THE CASING

(75) Inventors: Yoshiaki Kobayashi, Tokyo (JP); Takaaki Yoshihiro, Tokyo (JP); Nobuhiro Mikami, Tokyo (JP)

(73) Assignee: NEC Corporation, Tokyo (JP)

(21) Appl. No.: 12/181,702

(22) Filed: Jul. 29, 2008

Related U.S. Patent Documents

Reissue of:

(64) Patent No.: 7,094,985
Issued: Aug. 22, 2006
Appl. No.: 10/520,424
PCT Filed: Jul. 7, 2003
PCT No.: PCT/JP03/08575
§ 371 (c)(1),
(2), (4) Date: Jan. 7, 2005
PCT Pub. No.: WO2004/006277
PCT Pub. Date: Jan. 15, 2004

(30) Foreign Application Priority Data

Jul. 8, 2002 (JP) ..... 2002-198321
Dec. 2, 2002 (JP) ..... 2002-349404

(51) Int. Cl.
*H01H 13/715* (2006.01)

(52) U.S. Cl.
USPC ..... 200/516; 200/406

(58) Field of Classification Search
USPC .... 200/5 A, 511, 512, 516, 517, 406; 341/22; 345/168
See application file for complete search history.

(56) References Cited

U.S. PATENT DOCUMENTS

| | | | | | |
|---|---|---|---|---|---|
| 4,046,981 | A | * | 9/1977 | Johnson et al. | 200/516 |
| 4,086,451 | A | | 4/1978 | Boulanger | |
| 4,245,138 | A | * | 1/1981 | Harper | 200/5 A |
| 4,471,176 | A | * | 9/1984 | Inaba | 200/5 A |
| 4,771,143 | A | | 9/1988 | Hoffman | |
| 5,172,114 | A | * | 12/1992 | Bedoya et al. | 341/27 |
| 5,777,281 | A | * | 7/1998 | Riddiford | 200/5 A |
| 5,791,459 | A | * | 8/1998 | Hester et al. | 200/512 |
| 6,018,132 | A | | 1/2000 | Chen | |
| 6,114,644 | A | * | 9/2000 | Nishikawa | 200/406 |

(Continued)

FOREIGN PATENT DOCUMENTS

| | | |
|---|---|---|
| EP | 1152443 A2 | 11/2001 |
| JP | 465684 | 12/1971 |

(Continued)

OTHER PUBLICATIONS

Office Action dated Apr. 17, 2012 issued by the United States Patent and Trademark Office in counterpart U.S. Appl. No. 13/311,848.

(Continued)

*Primary Examiner* — Michael Friedhofer
(74) *Attorney, Agent, or Firm* — Sughrue Mion, PLLC

(57) ABSTRACT

A switch integrated type housing includes a housing body, a switch button sheet, a conductor and a cover sheet. The housing body is provided with a plurality of concave sections on an outer surface of the housing body. The switch button sheet is provided on the outer surface to cover the plurality of concave sections. The conductor has a dome shape downwardly projecting and is provided in each of the plurality of concave sections to contact the switch button sheet. The cover sheet is provided between the switch button sheet and the outer surface of the housing body in a portion of the outer surface of the housing body other than the plurality of concave sections and to cover a lower surface of the conductor in each of the plurality of concave sections.

27 Claims, 10 Drawing Sheets

U.S. PATENT DOCUMENTS

| | | | | |
|---|---|---|---|---|
| 6,396,923 | B1 | 5/2002 | Kitamura et al. | |
| 6,639,165 | B1 | 10/2003 | Newman et al. | |
| 6,806,815 | B1 * | 10/2004 | Kaikuranta et al. | 341/22 |
| 7,094,985 | B2 | 8/2006 | Kobayashi et al. | |
| 7,161,276 | B2 * | 1/2007 | Face | 310/314 |
| 7,547,857 | B2 | 6/2009 | Kim et al. | |
| 7,619,176 | B2 * | 11/2009 | Yoshihiro | 200/516 |
| 7,902,474 | B2 | 3/2011 | Mittleman et al. | |
| 7,960,663 | B2 | 6/2011 | Yoshihiro | |

FOREIGN PATENT DOCUMENTS

| | | | |
|---|---|---|---|
| JP | 47-4462-01 | U | 9/1972 |
| JP | 57-136134 | U | 8/1982 |
| JP | 59056177 | A | 3/1984 |
| JP | 60-168223 | U | 11/1985 |
| JP | 61-188225 | U | 11/1986 |
| JP | 61-189535 | U | 11/1986 |
| JP | 61189535 | U | 11/1986 |
| JP | 01-221824 | A | 9/1989 |
| JP | H01-221824 | A | 9/1989 |
| JP | 628952 | U | 4/1994 |
| JP | H06-28952 | A | 4/1994 |
| JP | 658537 | U | 8/1994 |
| JP | H06-58537 | U | 8/1994 |
| JP | 758815 | A | 3/1995 |
| JP | 765666 | A | 3/1995 |
| JP | H07-58815 | A | 3/1995 |
| JP | H07-65666 | A | 3/1995 |
| JP | 7154080 | A | 6/1995 |
| JP | H07-154080 | A | 6/1995 |
| JP | 08-148056 | A | 6/1996 |
| JP | H08-148056 | A | 6/1996 |
| JP | 08315677 | A | 11/1996 |
| JP | 10276249 | A | 10/1998 |
| JP | H10-276249 | A | 10/1998 |
| JP | 11149841 | A | 6/1999 |
| JP | H11-149841 | A | 6/1999 |
| JP | 2000-151136 | A | 5/2000 |
| JP | 2000151136 | A | 5/2000 |
| JP | 2000164057 | A | 6/2000 |
| JP | 2001-119455 | A | 4/2001 |
| JP | 2001119455 | A | 4/2001 |
| JP | 2001-216866 | A | 8/2001 |
| KR | 2000-0000366 | U | 1/2000 |

OTHER PUBLICATIONS

International Search Report issued Aug. 26, 2003 in PCT Application No. PCT/JP03/08575.

Japanese Office Action dated Jul. 31, 2012 issued by the Japanese Patent Office in corresponding Japanese Patent Application No. 2010-276628.

* cited by examiner

SWITCH INTEGRATED CASING AND ELECTRONIC EQUIPMENT HAVING THE CASING

Matter enclosed in heavy brackets [ ] appears in the original patent but forms no part of this reissue specification; matter printed in italics indicates the additions made by reissue.

TECHNICAL FIELD

The present invention relates to a housing structure for accommodating a functional section and an electronic equipment using the same.

BACKGROUND ART

In a small mobile terminal such as mobile phone, a PHS (Personal Handy Phone System), and a PDA (Personal Digital Assistant), tendency of a small size and a thin structure is accelerating. For the purpose of realization of a small mobile terminal with the small size and thin structure, the small size and thin structure of a functional part, the thin structure of a printed circuit board on which the functional parts are mounted, the small size of an antenna, and the thin structure of a housing which accommodates the functional parts and the printed circuit board and so on are carried forward.

FIG. 1 is a cross sectional view of a conventional small mobile terminal. As shown in FIG. 1, in the conventional small mobile terminal, generally, a front housing 501, switch buttons 525, a key sheet 502, switch domes 524, a switch board 555, a printed circuit board 504 on which electronic parts 503 are mounted are stacked in the direction of the thickness to be fixed on a back housing 558. Many through-holes exist in the front housing 501 and the switch buttons 525 are provided for the through-holes. Wiring line patterns 522A and 522B are formed on the surface of the switch board 555. The switch dome 524 is formed of an elastically deformable conductive material and the periphery of the switch dome 524 is connected with the wiring line pattern 522A. When the switch button 525 is pushed, the switch dome 524 transforms elastically through the key sheet 502, and the center portion of the switch dome 524 contacts the wiring line pattern 522B so that the wiring line patterns 522A and 522B are set to an electrically conductive state. In this way, predetermined data can be inputted. With the housing, the structure is demanded in which the thickness of the whole mobile equipment is made thin while maintaining mechanical strength. Conventionally, for the purpose of maintenance of the housing stiffness, reinforcement ribs are increased and reinforcement is carried out using components, as described in Japanese Laid Open Patent Application (JP-P2000-151136A).

In the conventional small mobile terminal shown in FIG. 1, many through-holes exist in the housing as described above. This causes large degradation of the stiffness of the front housing 501. Also, as shown in FIG. 1, generally, the switch button 525 has the thickness of about 1.4 mm, the key sheet 502 has the thickness of about 0.7 mm, the switch dome 524 has the height of about 0.3 mm, and the switch board 555 has the thickness of about 0.8 mm. The total thickness t2 of them is about 3.2 mm. These components tend to be made thin for the thin structure of the small mobile terminal. However, the thin structure degrades flexural rigidity and twisting stiffness of those components and these components have a possibility to be transformed or damaged. Especially, the housing is easy to transform through a switch operation by a user or by external force, because it has many through-holes for the switch buttons 525, in spite that the housing has an important function to prevent its own transformation and the transformation of the board 504. Thus, the transformation of the housing results in the transformation of the components mechanically connected with the housing. Especially, when the board 504 is transformed, peeling of solders from the electronic part 503 and the wiring line occurs because many electronic parts 503 are mounted on the board 504 and the wiring lines are provided. As a result, there is a possibility of occurrence of a trouble in the mobile terminal. Also, to use a rib and so on to prevent the occurrence of such a situation is a factor that hinders the thin structure of the equipment.

In conjunction with the above description, an operation unit of a mobile phone is disclosed in Japanese Laid Open Patent Application (JP-A-Heisei 7-58815). In this conventional example, a main board is accommodated in a cabinet body. An operation section concave section is formed on the cabinet body. On an operation section printed circuit board, a plurality of operation contacts are printed and LEDs are mounted. An operation button sheet is formed of a material having a light transmitting property and elasticity, and has a key top, on which light shielding print is carried out to leave predetermined numbers or characters, in positions corresponding to the operation contacts. An operation button cover has an opening in a location corresponding to the key top and has a pushing rib to push the operation button sheet on a lower surface of the button cover in the opening.

Also, a portable phone is disclosed in Japanese Laid Open Patent Application (JP-A-Heisei 10-276249). The portable phone of this conventional example is composed of an upper stage printed circuit board and a lower stage printed circuit board in a flat casing. A shield chassis is interposed between the printed circuit boards. A switch sheet has a plurality of switches for key input of a telephone number and is supported by a shield and sheet support board. A cell box has an upwardly projecting portion on the side of the upper stage printed circuit board and is provided below the lower stage printed circuit board. The shield chassis and the lower stage printed circuit board have blanked portions corresponding to the upwardly projecting portion of the cell box. The cell box is provided in a part non-existing region on the back side of the upper stage printed circuit board through the blanked portions of the shield chassis and the lower stage printed circuit board.

Also, a data input key is disclosed in Japanese Laid Open Patent Application (JP-A-Heisei 11-149841). The data input key of this conventional example has a key top formed of a light transmissible resin, and a light transmissible resin sheet on which a print is carried out and the key top is provided on the light transmissible resin sheet.

Also, a mobile terminal apparatus is disclosed in Japanese Laid Open Patent Application (JP-P2000-151136A). The mobile terminal apparatus of this conventional example has a printed circuit board on which parts are mounted, a lower case which has ribs to receive the parts in correspondence to the arrangement positions of the parts, and a battery case provided below the lower case to prevent the transformation of the lower case.

Also, a housing structure of a mobile terminal is disclosed in Japanese Laid Open Patent Application (JP-P2001-119455A). In this conventional example, the housing structure of the mobile terminal has a front case and a rear case. A printed circuit board is accommodated into a cavity formed between the front case and the rear case and the rear case has a concave section on the surface of the outside of the rear case. The side wall of the rear case is formed to have the thick thickness and form a concave section. The concave section is portioned into a cell room and an antenna room by ribs extending from the side wall.

SUMMARY OF INVENTION

Therefore, an object of the present invention is to provide a housing structure in which the stiffness can be maintain.

Another object of the present invention is to provide a thin housing structure.

Another object of the present invention is to provide a mobile terminal using the above housing structures.

In an aspect of the present invention, a switch integrated type housing includes a housing body, a switch button sheet, a conductor and a cover sheet. The housing body is provided with a plurality of concave sections on an outer surface of the housing body. The switch button sheet is provided on the outer surface to cover the plurality of concave sections. The conductor has a dome shape downwardly projecting and is provided in each of the plurality of concave sections to contact the switch button sheet. The cover sheet is provided between the switch button sheet and the outer surface of the housing body in a portion of the outer surface of the housing body other than the plurality of concave sections to cover a lower surface of the conductor in each of the plurality of concave sections.

Here, the switch integrated type housing may further include a switch button arranged on the switch cover sheet above the conductor. Also, the switch integrated type housing may further include a top plate provided on the switch button sheet to cover a periphery of the switch button.

Also, it is desirable that the housing body has a projection in a center of each of the plurality of concave sections. The projection may contact the cover sheet. In this case, it is desirable that a difference between a center of the conductor and the central axis of the projection is within 2.5% of a diameter of the projection. More desirably, the difference is within 1.25% of the diameter of the projection. Alternatively, it is desirable that the difference between a center of the conductor and the central axis of the projection is within 0.05 mm.

Also, the switch button sheet may include a first electrode provided on a lower surface of the switch button sheet apart from the conductor; and a second electrode provided on the lower surface of the switch button sheet to connect with an end of the conductor. When the switch button sheet corresponding to the concave section is pushed, the conductor contacts the first electrode. In this case, the second electrode may be provided on the lower surface of the switch button sheet to surround the first electrode. Also, the switch button sheet further may include a first wiring line pattern connected with the first electrode; and a second wiring line pattern connected with the second electrode. In this case, the first and second wiring line patterns may be embedded in the switch button sheet.

Also, the switch button sheet may have an extending portion and a blanked portion which has an arc shape to surround the first and second electrodes. In this case, the switch integrated type housing may further include a top plate provided on the switch button sheet to cover a periphery of a portion corresponding to the concave section. The blanked portion is covered by the top plate.

Also, the housing body may include a first electrode provided in a center of the concave section to penetrate the housing body; and a second electrode provided near to the first electrode apart from the first electrode to penetrate the housing body. The cover sheet has a first opening for the first electrode and a second opening for the second electrode, and the first electrode contacts with the conductor and the second electrode is apart from the conductor, and contacts with the conductor when a portion of the switch button sheet corresponding to the concave section is pushed. In this case, a difference between a center of the conductor and the central axis of the first electrode is desirably within 2.5% of a diameter of the projection, and more desirably within 1.25% of the diameter of the projection. Also, the difference between a center of the conductor and the central axis of the first electrode is desirably within 0.05 mm.

Also, the cover sheet has an opening in a portion in a center of the conductor, and the conductor has a projection to pass through the opening to extend downwardly.

Also, the housing body has a box shape, and a printed circuit board on which electronic parts are mounted is accommodated in the housing body.

Also, an electronic equipment has either one of the above switch integrated type housings.

BEST MODE FOR CARRYING OUT THE INVENTION

Hereinafter, the switch integrated type housing of the present invention will be described in detail with reference to the attached drawings.

First Embodiment

Figure 2:
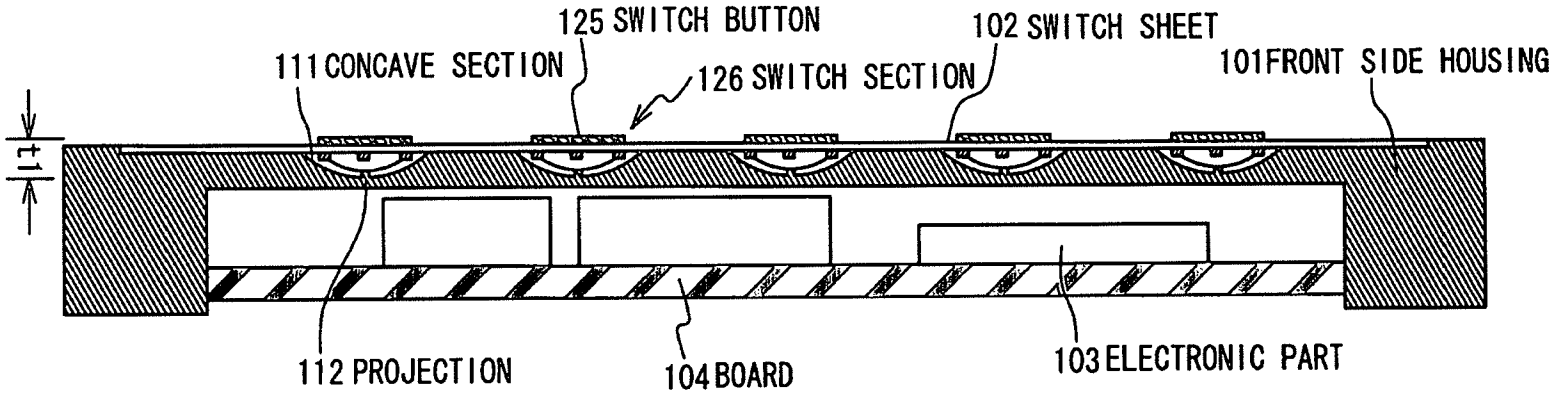
FIG. 2 is a cross sectional view showing a switch integrated type housing according to a first embodiment of the present invention.

FIG. 2 is a cross sectional view of the switch integrated type housing according to the first embodiment of the present invention. As shown in FIG. 2, the switch integrated type housing of the present invention has a box-shaped housing body 101 and a switch sheet 102. A plurality of concave sections 111 are formed on the surface of the housing body 101, and a projection 112 is formed in the central portion of the concave section 111. The switch sheet 102 is provided to cover a concave section and at least a part of an outer surface of the housing body other than the concave sections and is fixed to the housing body 111 in the outer surface of the housing body other than the concave sections. Also, a switch button 125 is arranged on the surface portion of the switch sheet 102 corresponding to the concave section. A switch section 126 is formed in the concave section 111 to have a switch button 125. A printed circuit board 104 is arranged inside the housing body 101, and on the printed circuit board 104, electron parts 103 are mounted and wiring line patterns are formed.

Figure 3:
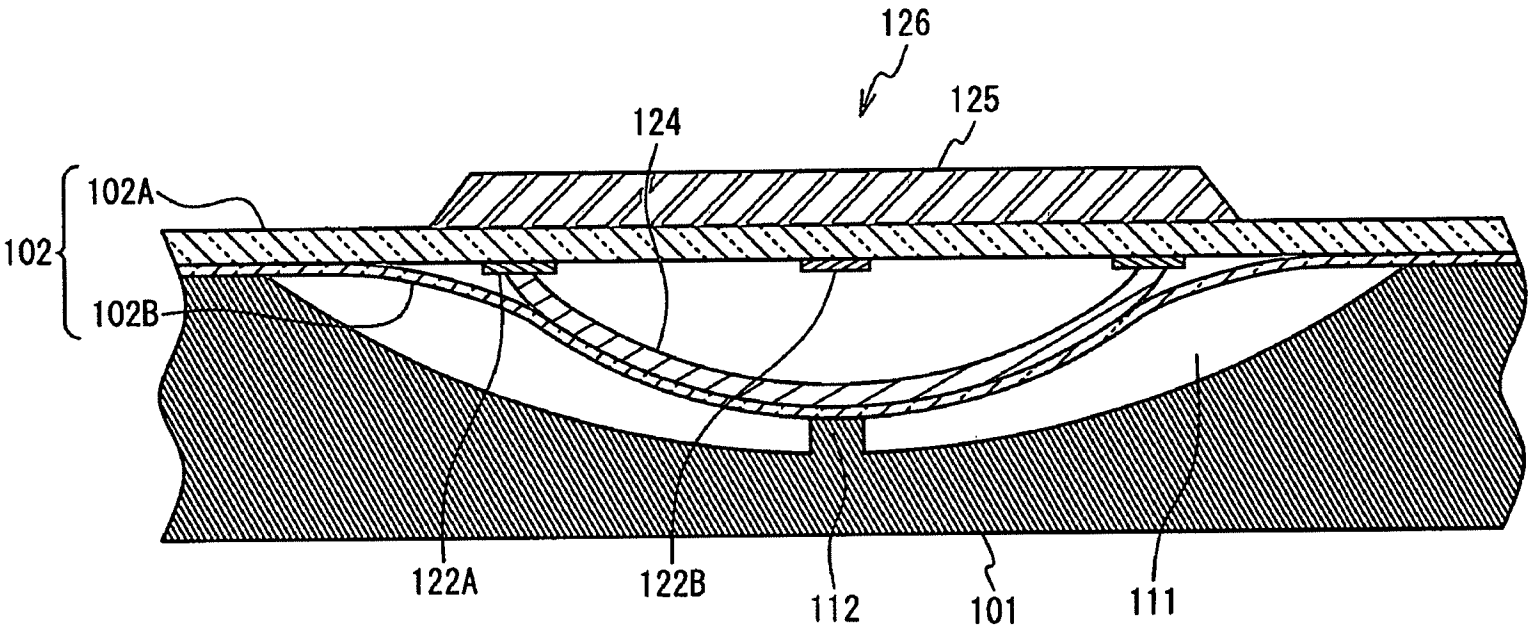
FIG. 3 is a cross sectional view of a switch section of FIG. 2.

FIG. 3 is a cross sectional view of the switch section of FIG. 2. In FIG. 3, the same reference numerals are given to the same components in FIG. 2 and the description will be appropriately omitted. As shown in FIG. 3, the switch sheet 102 is a composite sheet of a switch button sheet 102A and a cover sheet 102B which are formed of elastically transformable materials. In an area other than the area corresponding to the concave section 111, the switch button sheet 102A and the cover sheet 102B are pasted together and are fixed on the housing body 101. However, in the switch section 126, an elastically transformable conductor 124 has a shallow bowl shape to project downwardly and is put between the switch button sheet 102A and the cover sheet 102B. The conductor 124 is arranged on the cover sheet 102B, and receives force pushing up the switch button sheet 102A from the cover sheet 102B. A bowl-shaped space projecting downwardly is formed between the switch button sheet 102A and the cover sheet 102B on which the conductor 124 is arranged. The switch button 125 is formed on the surface of the switch button sheet 102A provided on the conductor 124. The switch button sheet 102A is FPC (Flexible Printed Circuit) sheet and wiring line patterns (electrodes) 122A and 122B are formed on the surface opposite to a surface on which the switch button 125 is formed. The wiring line patterns 122A and 122B are electrically connected with the electronic parts 103 on the printed circuit board of FIG. 2. Also, the wiring line pattern 122A is formed in a circle around the wiring line pattern 122B. The conductor 124 receives the pushing force from the cover sheet 102B, and the peripheral section of the conductor 124 contacts the wiring line pattern 122A so that the conductor 124 and the wiring line pattern 122A are always electrically connected. Here, the distance between the wiring line pattern 122B and the conductor 124 is about 0.2 mm, and it is small sufficiently compared with the diameter of the wiring line pattern 122A, namely, the size of the switch button sheet 102A in the depth direction in the concave section 111. Also, the switch button sheet 102A and the cover sheet 102B are formed of an elastic material.

When a user pushes the switch button 125, the switch button sheet 102A, the cover sheet 102B, and the conductor 124 are elastically transformed. Therefore, the wiring line pattern 122B is easily pushed downwardly and reaches the bottom of the conductor 124. At this time, because the bottom of the conductor 124 is pushed upwardly by the projection 112 in the concave section 111, the wiring line pattern 122B and the conductor 124 contact each other reliably. Thus, the wiring line pattern 122A and the wiring line pattern 122B are set to an electrically conductive state through the conductor 124.

The housing body 101 accommodates the printed circuit board 104 on which electronic parts 103 are mounted, functions as a base to support the switch sheet 102 and receives the force generated when the user pushes the switch button 125. At this time, the housing body 101 has the switch section 126 formed in the concave section 111. Therefore, the switch integrated type housing according to the present invention has sufficient stiffness because it does not have any through-hole for the switch button, unlike the conventional housing. By this, even if an external force is applied through the switch operation by the user, the housing body 101 has enough strength and is not transformed. Also, the printed circuit board 104 accommodated in the housing body 101 is not transformed and the solder peeling from the electronic parts 103 mounted on the printed circuit board 104 and the wiring line damage are prevented.

As described above, because the housing body 101 functions as the base to support the switch sheet 102, any independent base to install the switch becomes unnecessary. Therefore, the switch integrated type housing of the present invention has an advantage to allow the thin structure of a small mobile terminal. Moreover, because the space for the switch between the switch button sheet 102A and the cover sheet 102B is accommodated in the inside of the concave section 111 of the housing body 101, the height of the space of the switch dome is not added to the thickness of the mobile terminal, unlike the conventional mobile terminal. Thus, the thin structure of the small mobile terminal becomes possible.

Figure 1:
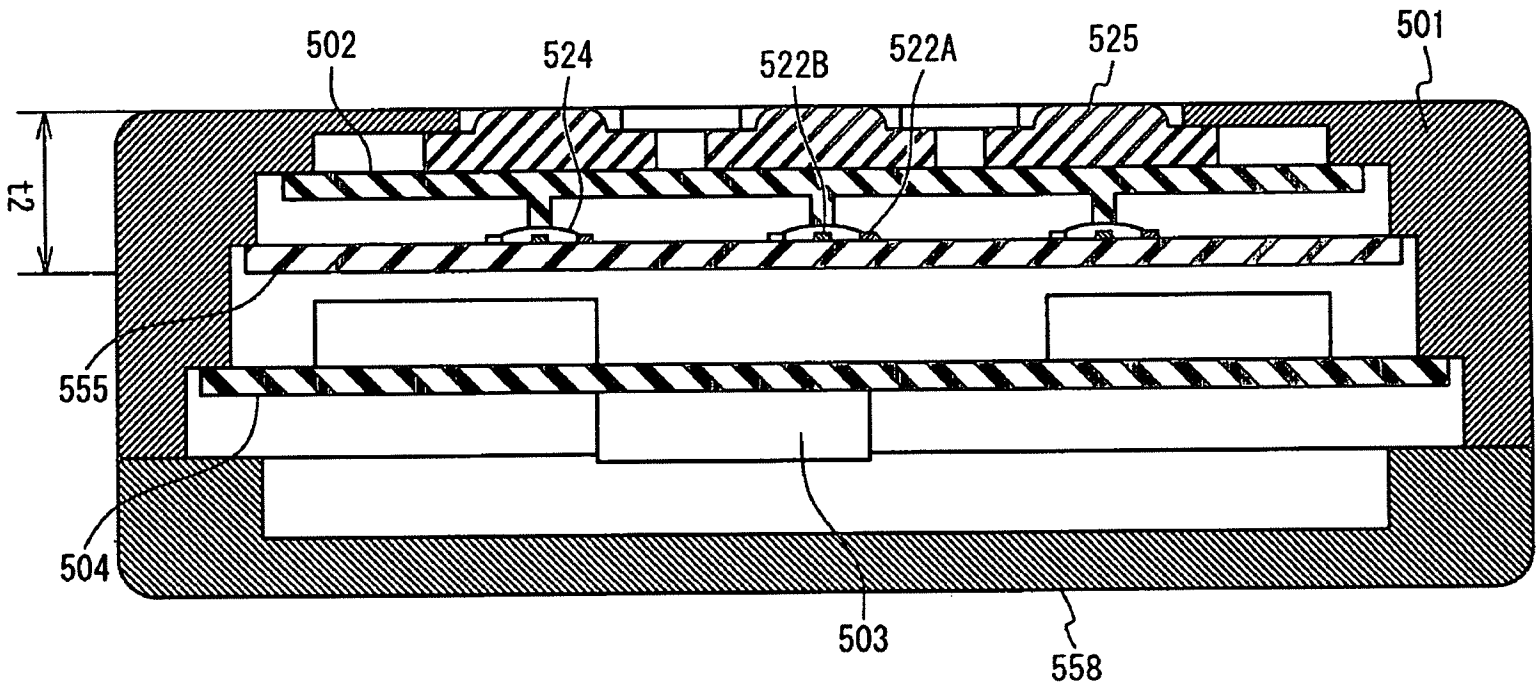
Fig. 1 PRIOR ART
FIG. 1 is a cross sectional view of a small mobile terminal of a conventional example.

Specifically, the thickness of the switch button 125 is about 0.5 mm, the thickness of the switch sheet 102 is about 0.1 mm, and the thickness of the housing body 101 is about 0.8 mm. The size shown by t1 in FIG. 2 is about 1.4 mm as a total thickness of them. The housing can be made thin by about 1.8 mm, compared with the size t2 of 3.2 mm in the conventional example shown in FIG. 1.

It should be noted that the above-mentioned housing structure is fixed on a back housing (not shown) to prevent the exposure of the back of printed circuit board 104. When the back of the printed circuit board 104 is electrically or mechanically protected by some protection material, the back housing is sometimes omitted.

Second Embodiment

Figure 4:
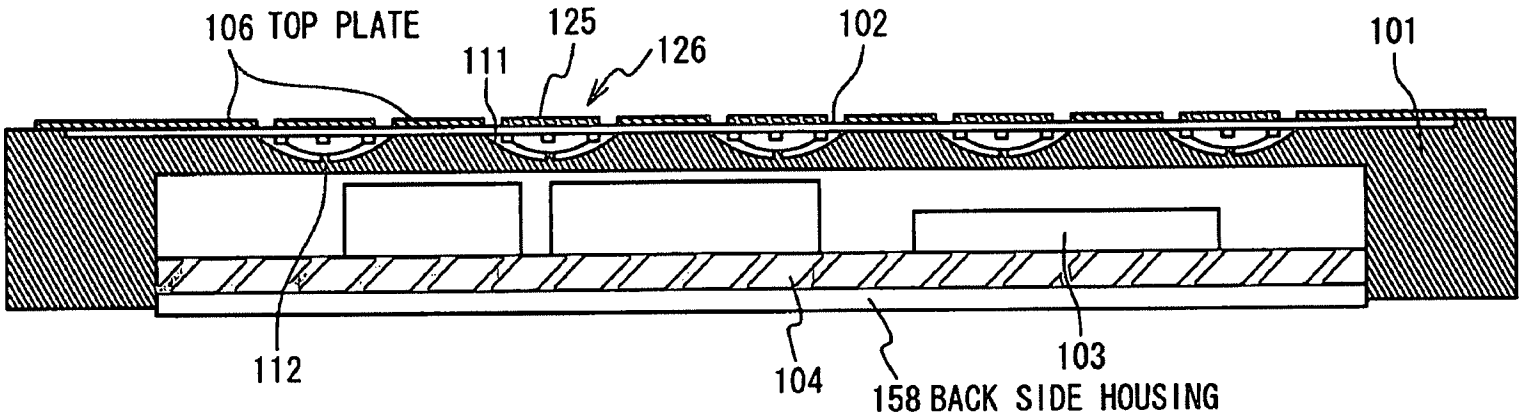
FIG. 4 is a cross sectional view of the switch integrated type housing according to a second embodiment of the present invention.
Figure 5:
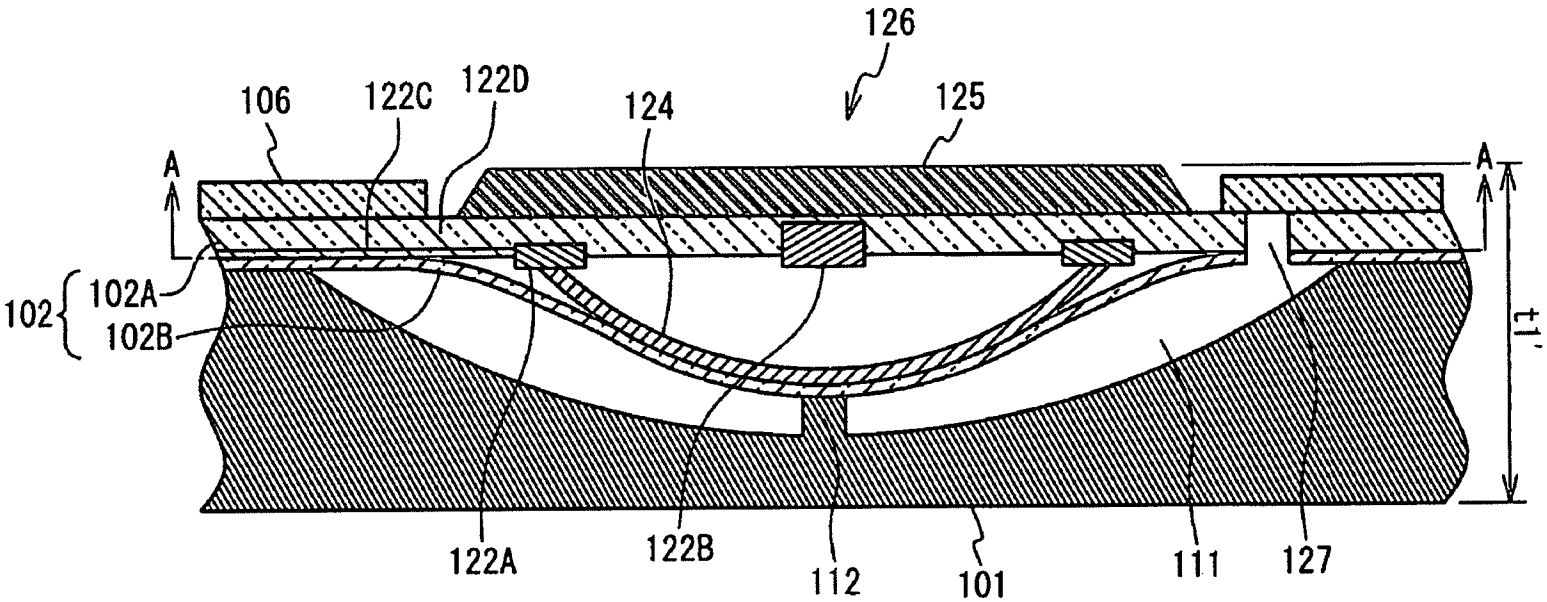
FIG. 5 is a cross sectional view of the switch section of FIG. 4.
Figure 6:
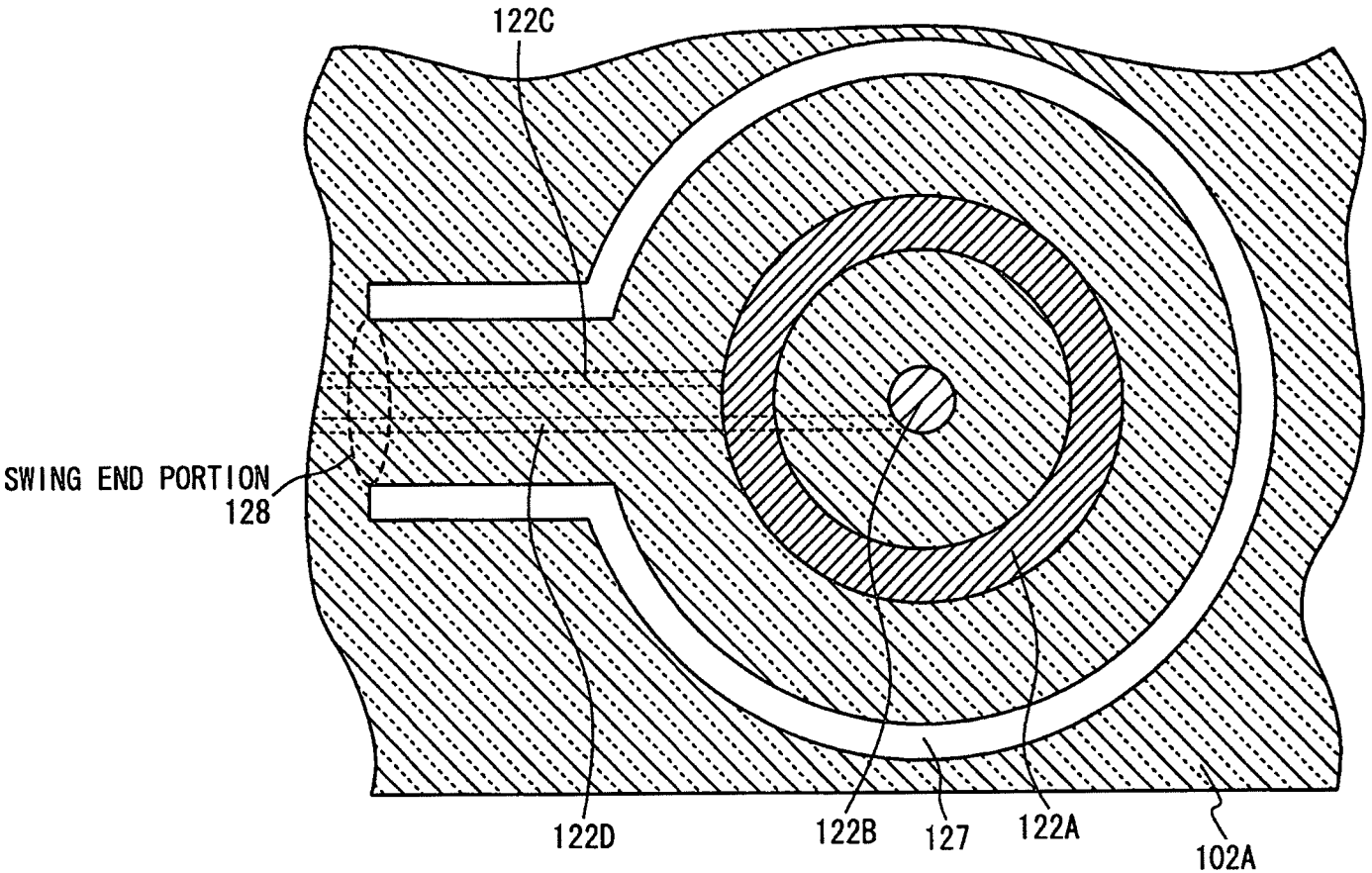
FIG. 6 is a plan view of the switch section along the A—A line of FIG. 5.
Figure 7:
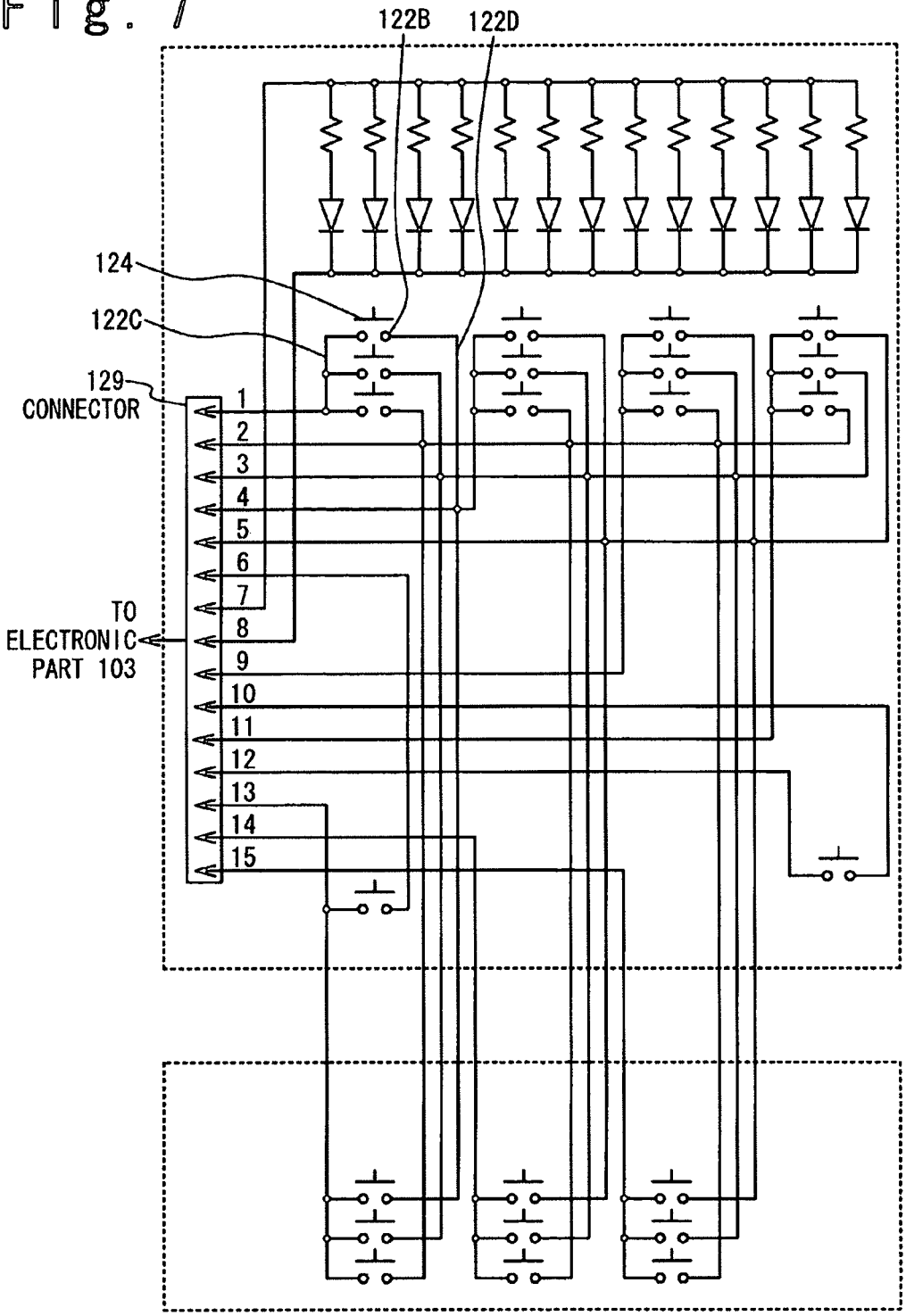
FIG. 7 is a circuit diagram showing a circuit of the switch button sheet of FIG. 5.

FIG. 4 is a cross sectional view of the switch integrated type housing according to the second embodiment of the present invention. FIG. 5 is an expanded view of the switch section of FIG. 4. FIG. 6 is a plan view of the switch integrated type housing along the A—A line of FIG. 5. In FIGS. 4, 5, and 6, the same reference numerals are given to the same components of FIGS. 2 and 3, and the description will be appropriately omitted. The second embodiment is different from the first embodiment shown in FIGS. 2 and 3 in the point that an arc section is formed on the switch sheet 102 coaxially with the wiring line patterns 122A and 122B outside the wiring line pattern 122A, and a blanked section 127 is formed to have the arc section and lines extending in parallel from ends of the arc section, and the point that a top plate 106 which has a through-hole in the position corresponding to the switch button 125 is adhered and fixed to the surface of the switch button sheet 102A. The top plate 106 is formed to cover the blanked section 127. A back housing 158 is fixed to the housing body 101 on the underside of the housing body 101. At least a part of the wiring line patterns 122A and 122B is partially embedded in the switch button sheet 102A. The wiring line patterns 122A and 122B extend inside the switch button sheet 102A from the right side to the left side in the figure as wiring line patterns 122C and 122D, and then the wiring line patterns 122A and 122B are electrically connected with the electronic parts 103 on the printed circuit board 104. FIG. 7 is a circuit diagram showing a circuit formed on the switch button sheet of FIG. 5. Various key switches are formed from the conductors 124, and the wiring line patterns 122A and 122B. The wiring line patterns 122C and 122D extending as a part of the wiring line patterns 122A and 122B are accommodated by a connector provided on the left end side of the housing of FIG. 4 and then are electrically connected with the electronic parts 103.

An adhesive layer is formed on the surface of the cover sheet 102B, and the cover sheet 102B is adhered to the conductor 124 in the concave section of the housing body and to the switch button sheet 102A in a portion other than the concave section of the housing. The force acts on the cover sheet 102B in the concave section of the housing body, to lift up the switch button sheet 102A by the cover sheet 102B. By the force, the conductor 124 is forced to shape a dome projecting downwardly and is pushed against the wiring line pattern 122A so that the conductor is electrically connected with the wiring line pattern 122A.

When the blanked section 127 is formed in the switch button sheet 102A, a swing operation of a remaining extending portion in the up and down directions using a swing end 128 as a swing axis is made easy. In the remaining extending section, the wiring line patterns 122A and 122B are formed on the switch button sheet 102A and are surrounded by the arc section of the blanked portion 127. Also, the center of the conductor 124 is adjusted in position to meet the center of the projection 112 in the concave section 111 in high precision, and is fixed with the cover sheet 102B. However, the center of the conductor 124 may be apart from the projection 112.

Figure 8:
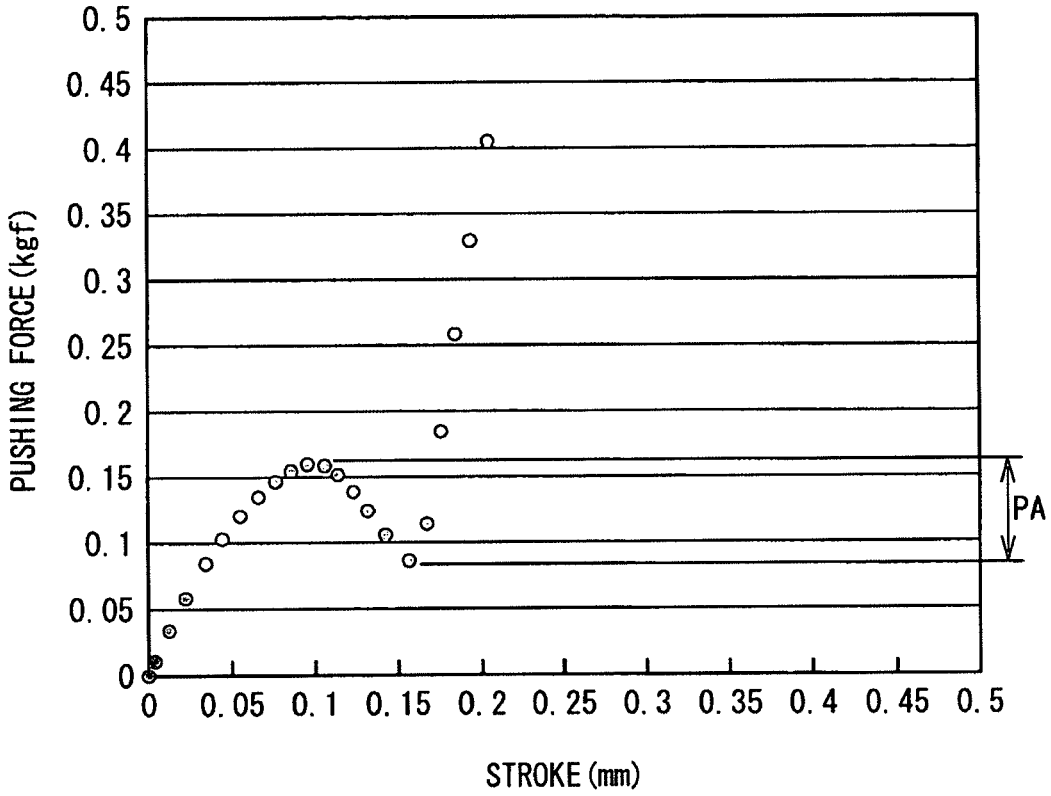
FIG. 8 is a graph showing the characteristics of pushing force—stroke quantity in the switch button of FIG. 5.

FIG. 8 shows the pushing force to the switch button 125 in FIG. 5 as a function of a downward stroke quantity of the switch button 125. When the user pushes the switch button 125, the pushing force increases gradually. When the pushing force exceeds the maximum value predetermined based on the material, structure and so on of the conductor 124, the conductor 124 buckles downwardly. As a result, the pushing force decreases rapidly. However, when the wiring line pattern 122B reaches the conductor 124, the pushing force increases rapidly again after the pushing force shows a minimum value. At this time, if the projection 112 exists in the concave section 111 as shown in FIG. 5, the difference PA between the maximum value and the minimum value in the pushing force becomes large, because the force is collectively applied to the center of the conductor 124 when the conductor 124 buckles. When the difference PA in the pushing force becomes large, the difference in anti-force sensed by a fingertip of the user becomes large. Thus, the fingertip can clearly sense a click. The click sense is a feel of the reliable switch operation by the finger when the user pushes the switch button 125. The clear click sense is important for an equipment accompanied by the button operation. In this embodiment, because the projection is formed in the concave section of the housing body, the user can receive the clear click sense. To get the clearest click sense, it is desirable that the diameter of the projection 112 is equal to or less than 1.5 to 1 mm, and the height thereof is about 0.2 mm. Moreover, this click sense is largely influenced by the axis difference of the central axis of the conductor 124 and the central axis of projection 112. For example, in the conductor 124 with the diameter of 4 mm contacting the wiring line pattern 122A, the decrease of the click sense is caused by about 50% in case of the axis difference of 0.3 mm and by about 20% in the axis difference of 0.1 mm (the difference PA between the maximum value and the minimum value in the pushing force of FIG. 8). Also, if this decrease of the click sense was below about 20%, the user could receive the clear click sense. In this embodiment, because the central axis of the conductor 124 and the central axis of the projection 112 can be adjusted in position in precision within 0.1 mm (2.5% of the diameter of the conductor 124), the click sense can be clearly received.

In this embodiment, it is possible that the thickness of the switch button 125 is about 0.3 mm, the thickness of the switch sheet 102 is about 0.2 mm, and the thickness of the housing body 101 is about 0.7 mm. In this case, the size shown by t1' in FIG. 5 is about 1.2 mm as a total of them. The thinner structure by about 2 mm is possible, compared with the corresponding size t2 of 3.2 mm in the conventional example shown in FIG. 1.

Third Embodiment

Figure 9:
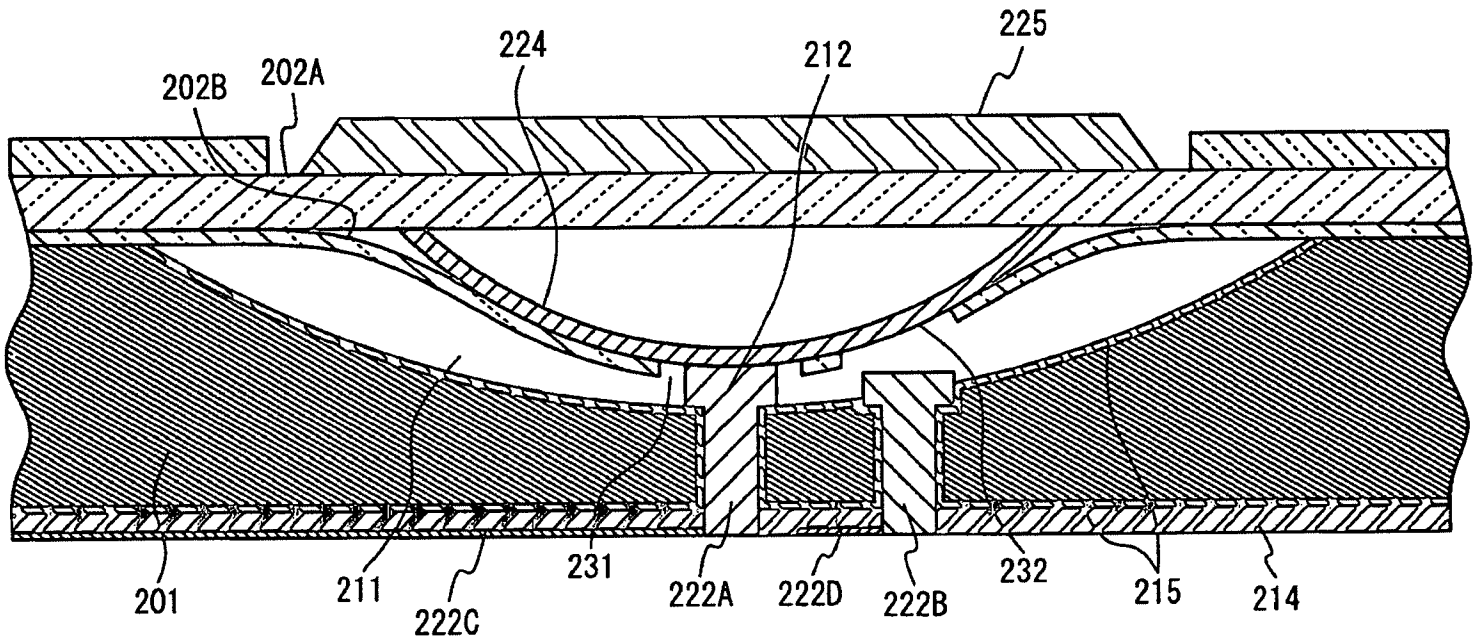
FIG. 9 is a cross sectional view of the switch section of the switch integrated type housing according to a third embodiment of the present invention.

FIG. 9 is a cross sectional view of the switch section of the switch integrated type housing according to the third embodiment of the present invention. In FIG. 9, reference numerals similar to those of FIG. 5 are given to the same components of FIG. 5 and the description will be appropriately omitted. The third embodiment is different from the second embodiment shown in FIG. 5 is in the point that any wiring line pattern is not formed on the switch button sheets 202A, two electrodes are formed in the concave section to penetrate the housing body, and openings are provided for portions of the cover sheet opposite to two electrodes. Here, one electrode 222A of the two electrodes is formed to pass through the housing body 201 in the center of the concave section and the top section of the electrode 222A is formed as a projection 212. The other electrode (wiring line pattern) 222B is formed in the neighborhood of the electrode (wiring line pattern) 222A.

A conductor 224 is fixed to always contact and to electrically connect with the electrode 222A through the cover sheet opening 231 provided for a portion opposite to the electrode 222A of the cover sheet 202B. Also, the conductor 224 does not contact the electrode 222B in the state that the switch button 225 is not yet pushed. However, when the switch button 225 is pushed, the conductor 224 contacts the electrode 222B through the cover sheet opening 232 provided for the portion opposite to the electrode 222B of the cover sheet 202B and is electrically connected with the electrode 222B. An insulating film 215 is formed on the surface of the concave section 211 of the housing body 201, on the surface opposite to the concave section surface and on the surface of the through-hole where the electrodes 222A and 222B are formed. A flexible printed circuit board 214 is formed on the insulating film 215 on the side opposite to the concave section 211 of the housing body 201. The wiring line patterns 222C and 222D are provided on the flexible printed circuit board 214 to extend from the electrodes 222A and 222B and to connect with the electronic parts mounted on the printed circuit board below the housing body 201, like the first and second embodiments. When the switch button 225 is pushed, the conductor 224 and the electrode 222B contact. Thus, the wiring line patterns 222C and 222D are set to the electrically conductive state. That is, the electrodes 222A and 222B and the conductor 224 form the switch.

This embodiment has an effect similar to the effects in the first and second embodiments, and has an effect that there is no case that the electrode is broken through the repetition of the switch operation because the flexible printed circuit board does not have a moving portion accompanying the switch operation. As a result, the reliability and the durability can be improved. Moreover, the resistance accompanying the motion of the switch button in the up and down directions is reduced because any wiring line pattern is not formed on the switch button sheet. Therefore, the present invention has the effect that the clearer click sense can be obtained.

It should be noted that it is not always necessary that the insulating film 215 is formed on the whole surface of the concave section 211 of the housing body 201, on the surface on the opposite to the surface of the concave section 211, and on the surface of the through-hole where the electrodes 222A and 222B are formed. The insulating film 215 is sufficient to be formed on the surface of the through-hole and in the neighborhood of the through-hole. Also, if the housing body 201 is formed of good insulator, the insulating film 215 does not have to be provided. Moreover, the blanked section may be formed in the switch button sheet, or the switch button sheet and the cover sheet, like the second embodiment.

Fourth Embodiment

Figure 10:
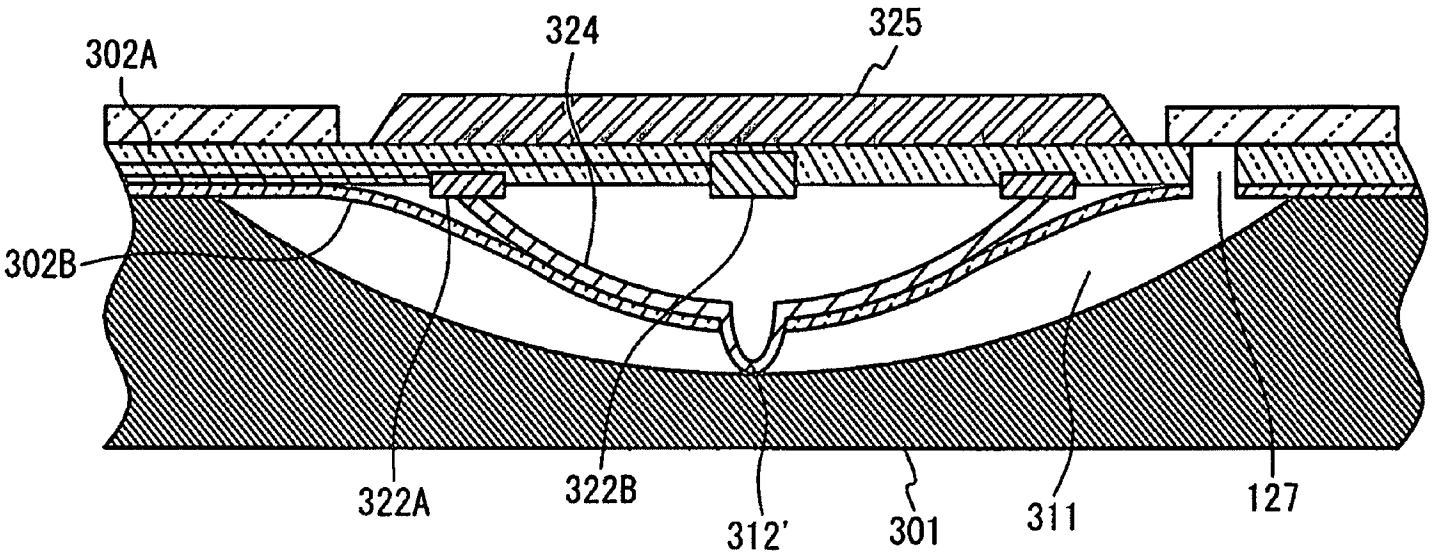
FIG. 10 is a cross sectional view of the switch section of the switch integrated type housing according to a fourth embodiment of the present invention.

FIG. 10 is a cross sectional view of the switch section of the switch integrated type housing according to the fourth embodiment of the present invention. In FIG. 10, the same reference numerals are given to the same component of FIG. 5 and the description will be appropriately omitted. The fourth embodiment is different from the second embodiment shown in FIG. 5 in the point that any projection is not formed in the concave section of the housing body and the point that a downward projection is formed in the bottom of the conductor in the center thereof to extend downwardly.

When the user pushes the switch button 325, the switch button sheet 302A, the cover sheet 302B, and the conductor 324 are elastically transformed. The wiring line pattern 322B is pushed downwardly and the wiring line pattern 322B contacts the conductor 324 and the wiring line patterns 322B and 322A are electrically connected through the conductor 324. At this time, the anti-force that the user feels on the fingertip decreases rapidly when the projection 312' of the conductor 324 buckles downwardly while the wiring line pattern 322B is pushed downwardly. Using this, a click sense is caused.

The thickness in the thinnest portion of the concave section of the housing body is about 0.35 mm. It is the size that it is difficult for mold material to flow through the thin structure in the general mold forming. When a liquid material is injected from the horizontal direction of FIG. 5, there is a possibility that wrinkle or crack is caused in the boundary section between the projection and the base thereof in the structure that the projection protrudes in the perpendicular direction to the horizontal direction and has a size desired to achieve the clearest click sense in the second embodiment. Therefore, it is required to provide a limitation in the injection condition and so on, in order to provide the projection of the above-mentioned size in good repeatability in the mold formation general for the manufacturing of the housing body. In such a case, the rise of the manufacturing cost can be sometimes caused. However, in this embodiment, the projection 312' is formed using the conductor 324, and such difficulty is avoided and the housing body can be formed in a good repeatability under general formation conditions in case of the general mold forming.

Also, as described in the second embodiment, the permissible axis difference between the central axis in the bottom of the conductor and the central axis of the projection is within 0.1 mm in case that the diameter of the conductor is 4 mm to achieve the clear click sense. When the conductor 324 and the projection 312' shown in FIG. 10 are pressed by a pressing machine, the difference of the central axis of the projection 312' can be restrained within 0.05 mm (1.25% of the diameter of the conductor) and the conductor 324 can be formed stably. Therefore, by restraining the decrease of the click sense within 20%, the press formation can be carried out without the cost increase. This embodiment has an effect of the reduction of a manufacturing cost and improvement of the assembling of the switch section, in addition to the same effect as the first and second embodiments.

The switch integrated type housing of the present invention is not limited only to the above-mentioned embodiments. A switch integrated type housing to which various modifications are carried out in the range of the present invention is contained in the scope of the present invention. For example, the conductor 124 or 324 receives pushing force from the cover sheet to contact the wiring line pattern 122A or 322A. However, as in a case that the conductor 124 or 324 is pressed and fixed to the wiring line pattern 122A or 322A, any means can be used as far as the conductor 124 or 324 contacts the wiring line pattern 122A or 322A. In this case, the cover sheet is not always necessary.

As described above, the switch integrated type housing according to the present invention has the switch section in the concave section and does not have the through-hole. Therefore, the stiffness is improved. By this, it is possible to improve the mechanical and electric reliability of the small mobile terminal.

Also, in the switch integrated type housing according to the present invention, the housing body is used as a base for the switch. Therefore, the independent base to install the switch becomes unnecessary. By this, it becomes possible to make a small mobile terminal thin.

The invention claimed is:

1. [A] *A switch type integrated housing, comprising:*

*a* housing body provided with a plurality of concave sections on an outer surface of said housing body;

a switch button sheet provided on said outer surface of said housing body to cover said plurality of concave sections;

a conductor having a dome shape downwardly projecting and provided in each of said plurality of concave sections to contact said switch button sheet; and a cover sheet provided between said switch button sheet and said outer surface of said housing body in a portion of said outer surface of said housing body other than said plurality of concave sections to cover a lower surface of said conductor in each of said plurality of concave sections; wherein said switch button sheet comprises:

a first electrode provided on a lower surface of said switch button sheet apart from said conductor; and a second electrode provided on the lower surface of said switch button sheet to connect with an end of said conductor, wherein when said switch button sheet corresponding to said concave section is pushed, said conductor contacts said first electrode;

and wherein said switch button sheet has an extending portion and a blanked portion which has an arc shape to surround said first and second electrodes.

2. The switch integrated type housing according to claim 1, further comprising:

a top plate provided on said switch button sheet to cover a periphery of a portion corresponding to said concave section, wherein said blanked portion is covered by said top plate.

3. A switch integrated type housing comprising:

a housing body provided with a plurality of concave sections on an outer surface of said housing body;

a switch button sheet provided on said outer surface of said housing body to cover said plurality of concave sections;

a conductor having a dome shape downwardly projecting and provided in each of said plurality of concave sections to contact said switch button sheet; and a cover sheet provided between said switch button sheet and said outer surface of said housing body in a portion of said outer surface of said housing body other than said plurality of concave sections to cover a lower surface of said conductor in each of said plurality of concave sections; wherein said housing body comprises:

a first electrode provided in a center of said concave section to penetrate said housing body; and a second electrode provided near to said first electrode apart from said first electrode to penetrate said housing body, wherein said cover sheet has a first opening for said first electrode and a second opening for said second electrode, and said first electrode contacts with said conductor and said second electrode is apart from said conductor, and contacts with said conductor when a portion of said switch button sheet corresponding to said concave section is pushed.

4. The switch integrated type housing according to claim 3, wherein a difference between a center of said conductor and the central axis of said first electrode is within 2.5% of a diameter of said projection.

5. The switch integrated type housing according to claim 4, wherein said difference is within 1.25% of the diameter of said projection.

6. The switch integrated type housing according to claim 3, wherein a difference between a center of said conductor and the central axis of said first electrode is within 0.05 mm.

7. The switch integrated type housing according to claim 3, wherein said cover sheet has an opening in a center of said conductor, and said conductor has a projection to pass through said opening to extend downwardly.

8. A switch integrated type housing comprising:

a housing body provided with a plurality of concave sections on an outer surface of said housing body;

a switch button sheet provided on said outer surface of said housing body to cover said plurality of concave sections;

a conductor having a dome shape downwardly projecting and provided in each of said plurality of concave sections to contact said switch button sheet; and a cover sheet provided between said switch button sheet and said outer surface of said housing body in a portion of said outer surface of said housing body other than said plurality of concave sections to cover a lower surface of said conductor in each of said plurality of concave sections;

wherein said housing body has a box shape, and a printed circuit board on which electronic parts are mounted is accommodated in said housing body.

9. An electronic equipment comprising:

a housing body provided with a plurality of concave sections on an outer surface of said housing body;

a switch button sheet provided on said outer surface of said housing body to cover said plurality of concave sections;

a conductor having a dome shape downwardly projecting and provided in each of said plurality of concave sections to contact said switch button sheet;

a cover sheet provided between said switch button sheet and said outer surface of said housing body in a portion of said outer surface of said housing body other than said plurality of concave sections to cover a lower surface of said conductor in each of said plurality of concave sections; and a printed circuit board having electronic parts thereon and accommodated in said housing body.

10. The electronic equipment according to claim 9, further comprising:

a switch button arranged on said switch cover sheet above said conductor.

11. The electronic equipment according to claim 10, further comprising:

a top plate provided on said switch button sheet to cover a periphery of said switch button.

12. The electronic equipment according to any of claims 9 to 11, wherein said housing body has a projection in a center of each of said plurality of concave sections.

13. The electronic equipment according to any of claims 9 to 11, wherein said projection contacts said cover sheet.

14. The electronic equipment according to any of claims 9 to 11, wherein a difference between a center of said conductor and the central axis of said projection is within 2.5% of a diameter of said projection.

15. The electronic equipment according to claim 14, wherein said difference is within 1.25% of the diameter of said projection.

16. The electronic equipment according to any of claims 9 to 11, wherein a difference between a center of said conductor and the central axis of said projection is within 0.05 mm.

17. The electronic equipment according to any of claims 9 to 11, wherein said switch button sheet comprises:

a first electrode provided on a lower surface of said switch button sheet apart from said conductor; and a second electrode provided on the lower surface of said switch button sheet to connect with an end of said conductor, wherein when said switch button sheet corresponding to said concave section is pushed, said conductor contacts said first electrode.

18. The electronic equipment according to claim 17, wherein said second electrode is provided on said lower surface of said switch button sheet to surround said first electrode.

19. The electronic equipment according to claim 17, wherein said switch button sheet further comprises:

a first wiring line pattern connected with said first electrode; and a second wiring line pattern connected with said second electrode.

20. The electronic equipment according to claim 19, wherein said first and second wiring line patterns are embedded in said switch button sheet.

21. The electronic equipment according to claim 17, wherein said switch button sheet has an extending portion and a blanked portion which has an arc shape to surround said first and second electrodes.

22. The electronic equipment according to claim 21, further comprising:

a top plate provided on said switch button sheet to cover a periphery of a portion corresponding to said concave section, wherein said blanked portion is covered by said top plate.

23. The electronic equipment according to any of claims 9 to 11, wherein said housing body comprises:

a first electrode provided in a center of said concave section to penetrate said housing body; and a second electrode provided near to said first electrode apart from said first electrode to penetrate said housing body, wherein said cover sheet has a first opening for said first electrode and a second opening for said second electrode, and said first electrode contacts with said conductor and said second electrode is apart from said conductor, and contacts with said conductor when a portion of said switch button sheet corresponding to said concave section is pushed.

24. The electronic equipment according to claim 23, wherein a difference between a center of said conductor and the central axis of said first electrode is within 2.5% of a diameter of said projection.

25. The electronic equipment according to claim 24, wherein said difference is within 1.25% of the diameter of said projection.

26. The electronic equipment according to claim 23, wherein a difference between a center of said conductor and the central axis of said first electrode is within 0.05 mm.

27. The electronic equipment according to claim 23, wherein said cover sheet has an opening in a center of said conductor, and said conductor has a projection to pass through said opening to extend downwardly.

* * * * *

UNITED STATES PATENT AND TRADEMARK OFFICE

CERTIFICATE OF CORRECTION

PATENT NO. : RE44,405 E
APPLICATION NO. : 12/181702
DATED : August 6, 2013
INVENTOR(S) : Yoshiaki Kobayashi et al.

It is certified that error appears in the above-identified patent and that said Letters Patent is hereby corrected as shown below:

In the Specification

Column 1, line 4: Insert --CROSS REFERENCE TO RELATED APPLICATIONS
A Divisional Reissue Application No. 13/311,848, filed December 6, 2011, has been filed as a divisional reissue of this reissue application.--

Signed and Sealed this
Tenth Day of December, 2013

Margaret A. Focarino

Margaret A. Focarino
*Commissioner for Patents of the United States Patent and Trademark Office*